United States Patent [19]
Bealor, Jr. et al.

[11] 3,775,734
[45] Nov. 27, 1973

[54] ECHO-RANGE EQUALIZER SONAR SYSTEM

[75] Inventors: Jesse L. Bealor, Jr.; John V. Lee, both of Panama City, Fla.

[73] Assignee: The United States of America as represented by the Secretary of the Navy, Washington, D.C.

[22] Filed: May 5, 1971

[21] Appl. No.: 142,835

[52] U.S. Cl.................. 340/3 A, 340/3 F, 340/1 R
[51] Int. Cl................................................ G01s 9/66
[58] Field of Search .................... 340/3 A, 3 R, 3 F, 340/1 R, 15.5 PS

[56] References Cited
UNITED STATES PATENTS

| 3,555,500 | 1/1971 | Longerich et al.................. 340/3 A |
| 3,502,169 | 3/1970 | Chapman ..................... 340/15.5 PS |
| 3,611,406 | 10/1971 | Hughes......................... 340/15.5 PS |

*Primary Examiner*—Benjamin A. Borchelt
*Assistant Examiner*—N. Moskowitz
*Attorney*—R. S. Sciascia, Don D. Doty and William T. Skeer

[57] ABSTRACT

Disclosed is a multi-channel sonar system which includes a liquid-lens electroacoustical transducer, a transmitter, a receiver, and an echo-range equalizer circuit connected thereto for energizing said transmitter in such manner that all sea floor echoes of the acoustical target search signals broadcast by said transducer are received thereby at substantially the same time for all channels operating within predetermined range limits, regardless of the contour of said sea floor.

13 Claims, 4 Drawing Figures

JESSE L. BEALOR, JR.
JOHN V. LEE
INVENTORS

BY *Dex S. Doty*

ATTORNEY

3,775,734

ECHO-RANGE EQUALIZER SONAR SYSTEM

STATEMENT OF GOVERNMENT INTEREST

The invention described herein may be manufactured and used by or for the Government of the United States of America for governmental purposes without the payment of any royalties thereon or therefor.

FIELD OF THE INVENTION

The present invention relates generally to echo-search-ranging systems and, in particular, pertains to a sonar system. In even greater particularity, it is an echo-range equalizer sonar system that eliminates the echo interference resulting from the transmission of internally reflected pulses which originate in a reversible, electroacoustical, multi-channel, acoustic lens transducer at the time a target search signal is broadcast thereby.

DESCRIPTION OF THE PRIOR ART

Heretofore, sonar systems were employed in combination with acoustic lens transducers and for some purposes were found to be adequate. However, where considerable accuracy and fidelity are required, they have left a great deal to be desired, inasmuch as the combined projector - hydrophone type of acoustic lens transducer gives rise to internal acoustical energy reflection problems, which, in turn, adversely affect the operation thereof. For example, because of acoustic impedance mismatch within the lens thereof, reflections of the transmitted pulses from the various frequency channels of multi-channel sonars cause unfocused beams to be formed. Of course, being unfocused, they effectively become broad beams which cause interference to occur between adjacent channels, thereby degrading the bearing and range resolution for which the lens was designed. One obvious way to eliminate such spurious reflections is to match the acoustic impedances throughout the lens; however, lens parameters are such that a tradeoff is usually required which does not permit a perfect match, and, therefore, the operation of prior art sonar systems incorporating acoustic lens transducers using such techniques are considerably less perfect than desired.

Also, it has been found that the acoustic window thickness of the prior art electroacoustical acoustic lens transducers may be selected to reduce deleterious internal acoustical reflections, but multiple frequency operation considerably limits the use of such solution.

SUMMARY OF THE INVENTION

The instant invention overcomes many of the disadvantages of the prior art sonar systems incorporating multi-channel electroacoustical transducers and especially constitutes an improvement thereover, because it employs electronic logic techniques that automatically implements acoustical energy transmission sequences which are proper to insure that echoes from anything ambient to the hunted targets - such as the sea floor, or the like - arrive back at the receiving transducer at substantially the same time for all frequency channels. Briefly, the invention may thus be summarized as being a multi-channel sonar system, wherein the receiver is effectively gated in such manner as to eliminate the sea bottom reverberation signals produced by adjacent frequency channels, so that weak echo returns from buried target objects are not mask thereby. And, as previously suggested, this is accomplished by automatically timing successive individually transmitted frequency search pulses in such manner as to cause the first echo return - that is, the bottom reverberation - for all channels to occur and be received simultaneously, despite the fact that different frequency channels have different slant ranges.

It is, therefore, an object of this invention to provide an improved multi-channel sonar system.

Another object of this invention is to provide a method and means for reducing the internal reflection interferences within an acoustical lens sonar transducer during the reception of target echoes thereby.

Still another object of this invention is to provide a new and useful sonar receiver and acoustic lens type of electroacoustical transducer combination.

A further object of this invention is to provide a unique method and means for simultaneously receiving sea bottom echoes of sonar signals broadcast toward a target object buried therein.

Another object of this invention is to provide an echo-search-ranging system having an improved signal-to-noise ratio.

Still another object of this invention is to provide an improved method and means for energizing an acoustic lens transducer, so as to effect an improvement in the focusing thereof with respect to each of the frequency channel signals broadcast and received thereby, as a result of being combined therewith.

Still another object of this invention is to provide an improved method and means for locating and identifying target objects located on or buried in a sea floor, regardless of the random contour thereof.

A further object of this invention is to provide a method and means for improving the target bearing resolution of an acoustic lens transducer combined with a multi-channel transmitter and receiver.

Still another object of this invention is to provide a sonar system that gates out the broad beam echoes resulting as sea floor reflections of previously broadcast, relatively narrow, beams of sonic energy.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
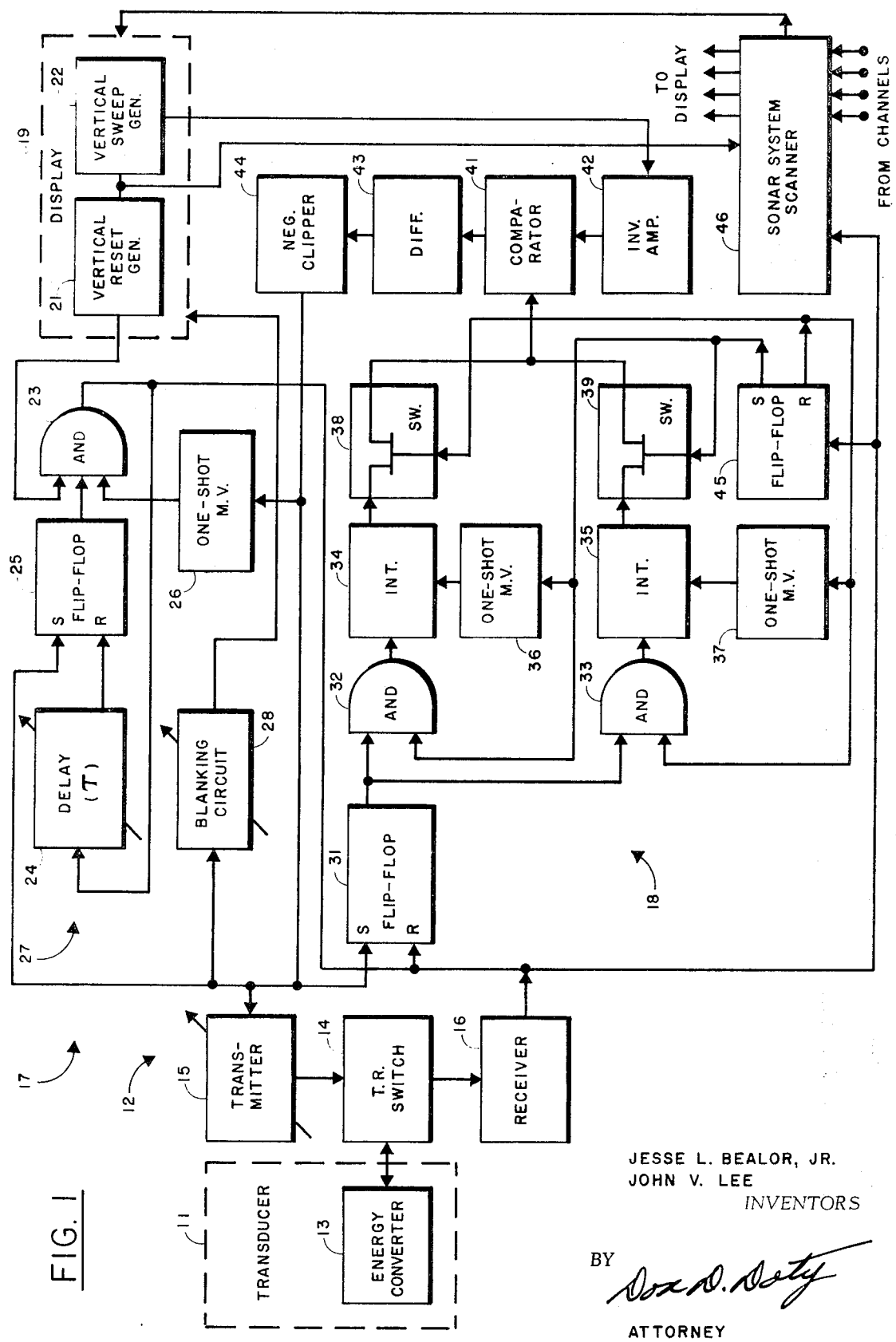
FIG. 1 is a block diagram of one of the channels of a multi-channel sonar system.

Referring now to FIG. 1, there is shown a transducer 11, which for the purpose of simplifying this particular disclosure, but not by way of limitation, will be considered to be an acoustic lens type of electroacoustical transducer that is adapted for being combined with a discrete frequency echo-search-ranging, equalizer channel 12, of a multi frequency system, which for reasons similar to those mentioned above, will be considered herewith to be a multi-channel active sonar type transceiver. Accordingly, transducer 11 contains an array of piezoelectric energy converter elements, with one for each frequency channel. Hence, among others not shown, transducer 11 includes a reversible electroacoustical energy converter 13, the input-output of which is connected to the input-output of a transmit-receive (TR) switch 14.

One of the inputs of TR switch 14 is connected to the output of a transmitter 15, the transmission frequency of which is capable of being set to that desired for entire equalizer channel 12, so as to make it compatible with its adjacent frequency channels and still be such as to be optimum for target search, range, resolution, fidelity, etc. The other output of TR switch 14 is connected to the input of a receiver 16.

Equalizer channel 12 (and each of the frequency channels associated therewith) is comprised of a transmission programmer subsystem 17, which timely activates transmitter 15 as a result of received or internally generated signals, and a reception programmer subsystem 18, which is activated by receiver 16 or signals also generated internally by the aforesaid transmission programmer subsystem 17.

Because the broadcast portion of the operation is initiated first in order to echo-range upon and, thus, search for targets, the structure of subsystem 17 will be discussed first.

A display 19 acts as the readout for all channels of the entire multi-channel sonar system. Because it contains - as one of its many conventional components - a vertical reset generator 21, the output thereof may be used to timely actuate transmission programmer subsystem 17, as well as vertical sweep generator 22, due to a synchronization connection therebetween. Of course, for the purpose of reading out or displaying the signal received by the aforesaid receiver 16, display 19 has its input effectively connected to the data output thereof, as will be discussed more fully subsequently.

The output of vertical reset generator 21 is connected to one of the inputs of an AND gate 23, the output of which is connected to the input of a 20 millisecond delay 24 ($\tau$), the output of which, in turn, is connected to the set input (S) of a bistable multivibrator type of flip-flop 25. The reset input (R) of flip-flop 25 is connected to the trigger input of the aforesaid transmitter 15 for being flipped by the trigger pulses being supplied thereto. Vertical reset generator 21, AND gate 23, delay 24, and flip-flop 25, of course, constitutes an initiator circuit 27.

An adjustable blanking circuit 28 is also connected between the trigger input of transmitter 15 and Display 19 for timely blanking out the readout of display 19, as will be discussed in more detail subsequently.

The output of receiver 16 is connected to the reset (R) input of a bistable multivibrator type of flip-flop 31. The output of flip-flop 31 is connected to one of the inputs of a pair of AND gates 32 and 33, and the outputs thereof are respectively connected to one of the inputs of a pair of integrators 34 and 35 of the type that converts the width of a squarewave type of input signal into a direct current (DC) signal that is proportional to the width thereof. Between the other input of AND gate 32 and the remaining clearing input of integrator 34 is a monostable one-shot multivibrator 36, and between the other input of AND gate 33 and the remaining clearing input of integrator 35 is a monostable one-shot multivibrator 37. The outputs of integrators 34 and 35 are respectively connected to the source inputs of a pair of field effect transistor switches 38 and 39, the drains of which are interconnected and coupled to one of the inputs of a comparator 41. The other input of comparator 41 is connected to the output of an inverter amplifier 42, and the input thereof is connected to the output of the aforesaid vertical sweep generator 22 of display 19. The output of comparator 41 is connected to the input of a differentiator 43, the output of which is connected through a negative clipper 44 to the trigger input of the aforesaid transmitter 15 and the set input of said flip-flop 31.

The output of receiver 16 is also connected to the toggle input of a bistable multivibrator type of flip-flop 45. One of the outputs of flip-flop 45 is connected to the input of one-shot multivibrator 36 and the gate input of field effect transistor switch 39, and the other output of flip-flop 45 is connected to the input of one-shot multivibrator 37 and the gate input of field effect transistor 38.

As previously indicated, the output of receiver 16 is effectively connected to the data input of display 19; however, for most practical purposes, a sonar system scanner 46 is usually inserted between the respective outputs of all of the channel receivers and display 19 - which, of course, constitutes the readout for any or all of said receivers of the entire multi-channel sonar system. However, since only one of the channels is disclosed herewith in detail in order to keep this case as simple as possible, only representative inputs from channels and outputs to display are shown. Obviously, although only five channels total are implied, any number thereof may be employed that would properly combine with the energy converter array of transducer 11 and function as desired for any particular operational purposes. Making the proper selection thereof would merely involve the making of design choices, the making of which would be well within the purview of one skilled in the art having the benefit of the teachings presented herewith.

Perhaps, at this time, it would also be noteworthy that each of the elements portrayed in block form in FIG. 1 is well known and conventional, per se; hence, it is to be understood that it is their unique interconnections and interactions that effects the new combination of elements constituting the subject invention and causes it to produce the new, improved, and useful results attributed thereto above.

Figure 2:
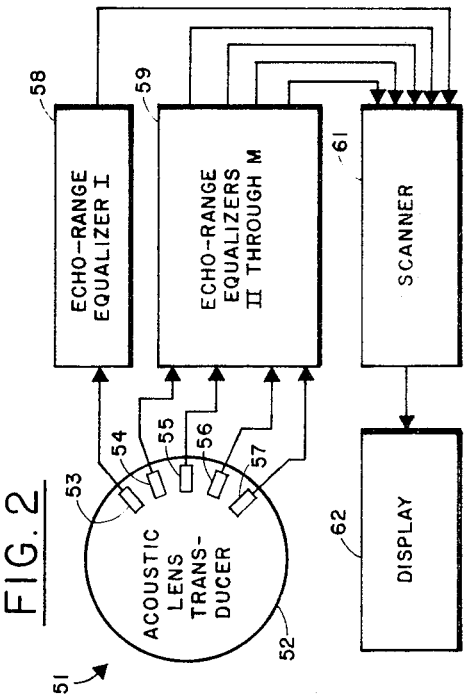
FIG. 2 is a block diagram of a multi-channel sonar system which incorporates a plurality of the channels of FIG. 1.

Referring now to FIG. 2, there is shown a multi-channel sonar system 51 which incorporates the invention to an advantage because it includes a plurality of echo range equalizers which are comparable to that depicted in FIG. 1, except, of course, that each thereof is designed to process data signals having frequencies which are respectively appropriate for any given operational circumstances. Obviously, with respect to the design choices that would have to be made to accommodate such frequencies, so doing would be readily appreciated and properly handled by the artisan having the benefit of the teachings presented herewith. Accordingly, they will not be described herein.

Included in sonar system 51 is an acoustic lens transducer 52 which is similar to transducer 11 illustrated in FIG. 1. As a general rule, such acoustic lens transducers are liquid lens transducers; however, it should be understood that the sonar system of this invention is not intended to be limited thereto and, thus, any suitable transducer may be substituted therefor. Nevertheless, in order to keep the disclosure of the preferred embodiment of this case as simple as possible, transducer 52 will merely be referred to as an acoustic lens transducer having a plurality of energy converter elements, each of which is comparable to energy converter 13 of transducer 11 of FIG. 1, but may be designed for broadcasting and receiving sonic energy having some other frequency. Also, in this particular instance, energy converter 53 is depicted as being connected to the channel of an echo-range equalizer I, referenced by numeral 58, while energy converters 54 through 57 are connected to the channels having a plurality of additional echo-range equalizers II through M, referenced by numeral 59. Connected to the outputs of echo-range equalizers 58 and 59 is a scanner 61, which may be programmed to selectively scan any or all thereof, as desired, and connected to the output of scanner 61 is a display 62 for reading out the data signals scanned thereby. Of course, in this case, scanner 61 is similar to the aforesaid scanner 46 of FIG. 1.

Figure 3:
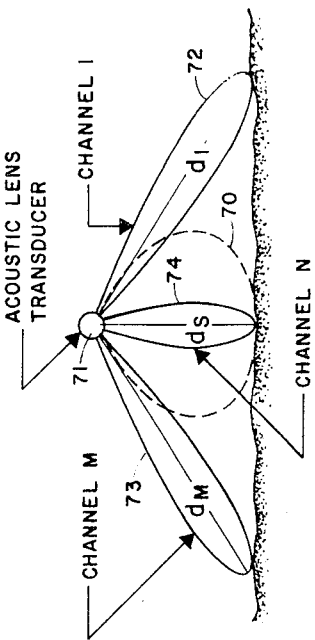
FIG. 3 is a quasi-pictorial diagram comparing the radiation and reception patterns of the prior art with those of the subject invention.

FIG. 3 illustrates a quasi-pictorial form how the subject invention effects the broadcast and reception functions of various frequency signals from its respective channels and the radiation patterns resulting therefrom. Only a transducer 71 is employed in this figure, although it should be understood that it is connected in a compatible manner to echo-range equalizer channels, like in FIG. 2. The various elements of this figure will be discussed further subsequently during the discussion of the operation of the invention.

Figure 4:
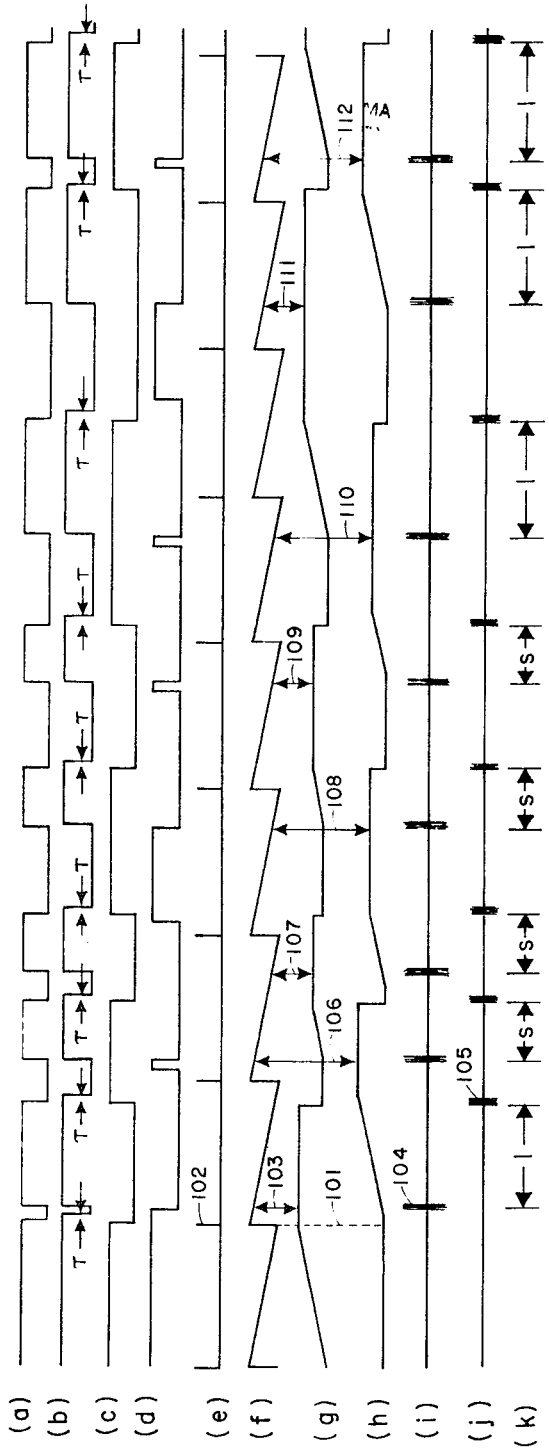
FIG. 4 is a graphical representation of idealized signal waveforms which respectively and timely emanate from some of the elements of the system of FIG. 1.

FIG. 4, being merely a graphical illustration of idealized waveforms of the data signals occurring at the outputs of various ones of the block-defined elements of FIG. 1, will likewise be discussed during the explanation of the invention's mode of operation.

MODE OF OPERATION

The operation of the invention will now be discussed briefly in conjunction with all of the figures of the drawing.

In a multi-channel acoustic lens transducer, internal reflections within the lens that result from acoustic impedance mismatch at the acoustic window will subsequently be transmitted therethrough and into the ambient medium within which the transducer is submerged. Since such transmitted reflections are unfocused, they will form broad beams, such as that exemplarily depicted as broad unfocused beam 70 emanating from transducer 71 in FIG. 3. For a 120° search sector like that shown between narrow focused beams 72 of channel 1 and 73 of channel M, the narrow beam focused slant ranges of each thereof - that is, $d_1$ and $d_M$ - to the sea floor are equal to twice the shortest distance $d_s$ to the sea floor. If all of the sonar channels are transmitted simultaneously, target echoes between channels 72 and 73 are mask by sea bottom echoes returning from channel 74 and its equivalent in the other channels, due to the fact that the transmitted internal reflections of the latter would be broad beam and, thus, would return bottom echoes for a considerable period of time, including the times of return of the echoes from a buried target, including if it were buried at a considerable depth below the sea bottom.

If the sea bottom were flat, the geometry of operation would be such as would enable the time of reception of the various channels to be at the same time. Such a situation would make it possible to blank out the strong bottom reverberations and also allow the receiver, by means of simple gating, to accept only echoes generated by the focused beams. But for a random contour bottom, each channel must act as its own depth sounder (range finder) to said bottom for its own particular transmission angle. This invention, as portrayed in the system of FIG. 1, when incorporated in each channel, allows each of such ranges to effectively be measured by their respective channels and, in addition, by means of employing unique electronic logic, determines the proper transmitter sequence necessary to insure that the bottom echoes of all frequency channels arrive back at the receiving transducer at substantially the same time, thereby allowing them to be timely blanked out and thus prevent their interferring with real target echoes.

The device of FIG. 1 performs the aforementioned overall functions for each frequency channel as a result of the following individual operations - indicated for the most part by the waveforms of FIG. 4 - being performed therein by the respective, but interacting, components thereof. All of the frequency channels of the entire sonar system contain structures which are substantially identical in purpose but, of course, each thereof is designed to function independently at its own individual frequency, regardless of the repetition rate thereof. Hence, in order to keep this disclosure as simple as possible, only one representative channel has been illustrated in detail in FIG. 1 and will now be discussed (although all channels are symbolically and functionally indicated in FIG. 2). For some practical purposes, it could be considered that the channel of FIG. 1 is self-contained and could operate as a single frequency sonar system, if so desired. Although it will now be explained as such, it should be understood that, by including the proper design parameters therein, any number thereof could be combined with a liquid lens transducer having a like number of energy converters. Obviously, the number and frequencies of such channels selected are unlimited and would merely involve the making of design choices, the making of which would be well within the purview of the artisan having the benefit of the teachings presented herewith.

When the system of FIG. 1 is turned on, and thus power is applied thereto, certain things occur initially and simultaneously which set the stage, so to speak, for actual subsequent echo-ranging operations.

Because at the instant the sonar is turned on no transmission has occurred and, thus, no target echoes have been received, various and sundry components must be initially enabled, in order to put them into such state that they will function properly. Hence, by supplying power thereto, such enabling events are effected, viz., flip-flops 31, 25, and 45 are "set," thereby causing them to produce positive output signals, as indicated in FIGS. 2(a), 2(b), and 2(c), respectively. One shot multivibrator 26 is also triggered at that time, so as to produce a positive output signal as shown in FIG. 2(d).

The "setting" of flip-flops 31 and 45 causes integrator 34 to be connected to the output of flip-flop 31 through the enabling of AND gate 32, and, in addition to the output of integrator 35, is effectively connected to the input of comparator 41 because switch 39 is closed. Because no signal has been stored in integrator 35 at that time, no coincidence occurs between the output thereof and the amplified inverted vertical sweep output of amplifier 42, as is shown at point-in-time 101 at FIGS. 2(f) and 2(h), respectively. But during the same period of time, integrator 34 integrates to a maximum stored voltage level.

At the end of one sweep cycle, as indicated by FIG. 2(e) and 2(f), the end-of-cycle pulse 102 (see FIG. 2(e)) from vertical sweep generator 21 passes through enabled AND gate 23, because, as previously indicated, the positive outputs of flip-flop 25 and one-shot multivibrator 26 are positive as a result of turning the entire system on.

The passed output pulse from AND gate 23 "resets" flip-flop 31, flips flip-flop 45, and after a delay by delay 24, "resets" flip-flop 25. Integrator 35 is cleared and connected to the output of flip-flop 31 by And gate 33, and integrator 34 is connected to comparator 41 by the closing of switch 38.

Since, as previously indicated, integrator 34 integrated to a peak voltage level, coincidence with the output of the amplified vertical sweep sawtooth signal from amplifier 42 at point-in-time 103 (see FIG. 2(f)) occurs just after sweep begins. As a result of such coincidence, comparator 41 produces an output signal, which, in turn, is differentiated by differentiator 43, negative clipped by clipper 44, to effect a trigger signal that "sets" flip-flops 31 and 25, initiates blanking circuit 28, and triggers transmitter 15, so as to cause the acoustical target search signal 104 of FIG. 2(i) to be broadcast by energy converter 13 of transducer 11.

Blanking circuit 28, being manually adjustable, should be set to blank display 19 for a period of time after the broadcast of acoustical target search signal 104. Thus, if it is set to blank slightly beyond the range to the sea bottom - that is, slightly longer than the time it takes signal 104 to travel to and from the sea floor - the strong spurious sea bottom interface echoes can be blanked out.

All return echoes of broadcast signal 104, including target echo 105 as illustrated in FIG. 2(j), are received by energy converter 13 of transducer 11 and passed on via transmit-receive (TR) switch 14 to receiver 16 for processing for more useful qualities and levels thereby. A target echo, thus, "resets" flip-flop 31 and flip-flop 25 after delay 24. It also flips flip-flop 45 and, hence, the transmit-receive cycle is now ready to be repeated.

Now, one-shot multivibrator 26 is set to provide a negative output for each trigger received from negative clipper 44. The duration of this negative output is equal to one cycle - that is, one vertical sweep period. When one-shot multivibrator 26 is negative, And gate 23 is inhibited, and no vertical reset pulse from generator 21 can pass therethrough. This arrangement insures that, if an output from clipper 44 occurs - that is, if transmission takes place - no reset pulse from generator 21 can pass through And gate 23 until a time equal to the maximum range period. Thus, the subject circuit "looks" for received echoes during that time. Of course, if a target echo is actually received, flip-flop 31 is "reset" thereby, flip-flop 25 is "reset" after the delay period of delay line 24, and flip-flop 45 is flipped. Therefore, the second cycle is now at the end thereof, and in a condition similar to that indicated above as being ready for another cycle to commence.

If no target echo is received by the end of any cycle measured from the time of transmitter trigger, the inhibit of And gate 23 is removed by the expiration of the set time of one-shot multi-vibrator 26, and the next reset pulse from generator 21 passes through said And gate 23 to effect the "resetting" of flip-flop 31, and after a delay through delay 24, flip-flop 25. Also, at that time, flip-flop 45 is flipped.

Although only two cycles of operation have been described above, FIG. 2 illustrates a number of representative additional cycles. In each case, points-in-time 107 through 112 respectively depict the comparison of range representative received signals with inverted vertical sweep signals to effect the broadcast of search signals accordingly, so as to effect the returns thereof from the same target as essentially the same time, regardless of the ranges involved as a result of the sea bottom not being flat. Of course, as previously suggested, if blanking circuit 28 is adjusted to blank display 19 for a period of time necessary to blank out said sea bottom reflections, any targets located at a longer range - that is, buried under the sea bottom - will be received with a much better signal-to-noise ratio; hence, they will be more easily detected and identified by a human operator observing display 19.

For the purpose of illustrating different range situations, a sequence thereof has been indicated and labeled as being long (l) and short (s), relatively speaking. From left to right, said ranges are illustrated as being l, s, s, s, s, l, l, l, even though all long ranges are not identical distances and all short ranges are not identical distances.

The video output of receiver 16 is scanned by multiplexer block scanner 46, along with the receivers of all of the other frequency channels. Accordingly, scanner 46 is connected to vertical reset generator 21 and vertical sweep generator 22 for appropriate synchronization therewith. As a result of such scanning the outputs of each of said receivers, including receiver 16 of discrete frequency channel 12, are timely read out by display 19 as target echoes.

In view of the foregoing, it may readily be seen that the subject invention constitutes a considerable advance in the sonar art and produces results heretofore unobtainable therefrom.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A sonar system, comprising in combination:
means for broadcasting an acoustical signal throughout a predetermined aqueous medium in response to a first signal supplied thereto;
means for receiving the acoustical signal broadcast by said broadcasting means after it has been reflected from an object and for producing a second signal in response thereto;
a display means having a vertical reset generator for timely producing a series of pulses and a vertical sweep generator for producing a sawtooth sweep signal the frequency of which is synchronized with said series of pulses, effectively connected to the output of said receiving means;

means connected to the output of the vertical sweep generator of said display means for inverting said sawtooth signal;

means connected between the aforesaid broadcasting and receiving means for timely producing a third signal the voltage of which is proportional to the range of said object in response to said first and second signals;

means connected between the outputs of said third signal producing means and said sawtooth signal inverting means and the input of said broadcasting means for supplying said first signal thereto whenever voltage level coincidence occurs between said third signal and the inverted sawtooth signal produced by said inverting means.

2. The sonar system of claim 1, wherein said means for broadcasting an acoustical signal throughout a predetermined aqueous medium in response to a first signal supplied thereto comprises:

a transmitter; and a reversible electroacoustical energy converter effectively connected to the output of said transmitter.

3. The sonar system of claim 1, wherein said means for broadcasting an acoustical signal throughout a predetermined aqueous medium in response to a first signal supplied thereto comprises:

a transmitter; and an acoustic liquid lens transducer having a reversible electroacoustical energy converter, with the input of said reversible electroacoustical energy converter effectively connected to the output of the aforesaid transmitter.

4. The sonar system of claim 1, wherein said means for receiving the acoustical signal broadcast by said broadcasting means after it has been reflected from an object and for producing a second signal in response thereto comprises:

an acoustic liquid lens transducer having a reversible electroacoustical energy converter; and a receiver effectively connected to the output of said reversible electroacoustical energy converter.

5. The sonar system of claim 1, wherein said means connected between the aforesaid broadcasting and receiving means for timely producing a third signal the voltage of which is proportional to the range of said object in response to said first and second signals comprises:

a first flip-flop having a set input connected for receiving said first signal and reset input connected for receiving said second signals;

a first And gate having a pair of inputs and output, with one of the inputs thereof connected to the output of said first flip-flop;

a second And gate having a pair of inputs and an output, with one of the inputs thereof connected to the output of said flip-flop;

a first integrator connected to the output of said first And gate;

a second integrator connected to the output of said second And gate;

a first one-shot multivibrator connected between the other input of said first And gate and the clearing input of said first integrator;

a second one-shot multivibrator connected between the other input of said second And gate and the clearing input of said second integrator;

a first switch having a data input, a control input, and an output, with the data input thereof connected to the output of said first integrator;

a second switch having a data input, a control input, and an output, with the data input thereof connected to the output of said second integrator; and a second flip-flop having a toggle input and a pair of outputs, with the toggle input thereof connected to the output of the aforesaid receiving means, with one of the outputs thereof connected to the input of said first one-shot multivibrator, the other input of said first And gate, and the control input of said second switch, and with the other output thereof connected to the input of said second one-shot multivibrator, the other input of said second And gate, and the control input of said first switch.

6. The sonar system of claim 1, wherein said means connected between the outputs of said third signal producing means and said sawtooth signal inverting means and the input of said broadcasting means for supplying said first signal thereto whenever voltage level coincidence occurs between said third signal and the inverted sawtooth signal produced by said inverting means comprises:

a coincidence comparator;

a differentiator connected to the output of said coincidence comparator; and a negative clipper connected to the output of said differentiator.

7. The invention of claim 1, further characterized by means connected between the output of the vertical reset generator of said display means and the input of said broadcasting means for timely supplying said first signal thereto whenever no voltage level coincidence occurs between the aforesaid third and inverted sawtooth signals.

8. The device of claim 7, wherein said means connected between the output of the vertical reset generator of said display means and the input of said broadcasting means for supplying said first signal thereto whenever no voltage level coincidence occurs between the aforesaid third and sawtooth signals comprises:

an And gate having a trio of inputs and an output, with one of the inputs thereof connected to the output of said vertical reset generator, and with the output thereof connected to the output of the aforesaid receiving means;

a delay means having an input and an output, with the input thereof connected to the output of said And gate;

a flip-flop having a set input, a reset input, and an output, with the reset input thereof connected to the input of said broadcasting means, with the set input thereof connected to the output of said delay means, and with the output thereof connected to another of the inputs of said And gate; and a one-shot multivibrator connected between the reset input of said flip-flop and the remaining input of the aforesaid And gate.

9. The invention of claim 8, further characterized by an adjustable blanking circuit connected between the input of said broadcasting means and an input of the aforesaid display means for blanking said display means a predetermined period of time in response to said first signal.

10. The invention of claim 9, further characterized by scanner means connected between the output of said receiving means and the data signal input of said display means for timely supplying said second signal thereto.

11. A sonar system incorporating a reversible liquid lens transducer which includes a plurality of electroacoustical energy converters, each of which is tuned for broadcasting and receiving acoustical energy within a predetermined environmental medium at a frequency that is different from that of the others, and each of which is connected to a combination of elements comprising:

a transmitter having an input and an output, with the output thereof effectively connected to the input of one of the energy converters of said liquid lens electroacoustic transducer;

a receiver having an input and an output, with the input thereof effectively connected to the output of the aforesaid energy converter of said liquid lens electroacoustic transducer;

a readout, having a synchronized vertical reset generator and a vertical sweep generator, effectively connected to the output of said receiver for displaying the signals received thereby;

a first flip-flop having a set input, a reset input, and an output, with the reset input thereof connected to the output of said receiver;

a second flip-flop having a toggle input, a set output, and a reset output, with the toggle input thereof connected to the output of said receiver;

a first And gate having a pair of inputs and an output, with one of the inputs thereof connected to the output of said first flip-flop;

a first integrator having a data input, a clearing input, and an output, with the data input thereof connected to the output of said first And gate;

a first one-shot multivibrator having an input and an output, with the input thereof connected to the other input of said first And gate and the set output of the aforesaid second flip-flop, and with the output thereof connected to the clearing input of said first integrator;

a first switch having a data input, a control input, and an output, with the data input thereof connected to the output of said first integrator, and with the control input thereof connected to the reset output of said second flip-flop;

a second And gate having a pair of inputs and an output, with one of the inputs thereof connected to the output of said first flip-flop and with the other input thereof connected to the reset output of said second flip-flop;

a second integrator having a data input, a clearing input, and an output, with the data input thereof connected to the output of said second And gate;

a second one-shot multivibrator having an input and an output, with the input thereof connected to the other input of said second And gate and to the reset output of said second flip-flop and with the output thereof connected to the clearing input of the aforesaid second integrator;

a second switch having a data input, a control input, and an output, with the data input thereof connected to the output of said sceond integrator, with the control input thereof connected to the set output of said second flip-flop, and with the output thereof interconnected with the output of the aforesaid first switch;

an inverter amplifier having an input and an output, with the input thereof connected to the output of the vertical sweep generator of the aforesaid readout;

a comparator having a pair of inputs and an output, with one of the inputs thereof connected to the aforesaid interconnected outputs of said first and second switches and with the other input thereof connected to the output of said converter amplifier;

a differentiator connected to the output of said comparator;

a negative clipper having an input and an output, with the input thereof connected to the output of said differentiator and with the output thereof connected to the set input of the aforesaid first flip-flop and to the input of said transmitter;

a third And gate having a trio of inputs and an output, with one of the inputs thereof connected to the output of vertical reset generator of said readout and with the output thereof connected to the reset input of said first flip-flop;

a third one-shot multivibrator having an input and an output, with the input thereof connected to the output of the aforesaid negative clipper, and with the output thereof connected to another of the inputs of said third And gate;

a third flip-flop having a set input, a reset input, and an output, with the set input thereof connected to the output of said negative clipper and with the reset input thereof connected to the input of the aforesaid transmitter;

a delay having an input and an output, with the input thereof connected to the output of said third And gate and with the output thereof connected to the set input of said third flip-flop; and a blanking circuit connected between the output of said negative clipper and an input of the aforesaid readout for timely blanking the received signals displayed thereby.

12. The invention of claim 11, further characterized by:

a scanner having a plurality of inputs and a plurality of outputs, with one of the inputs thereof connected to the output of said receiver and with one of the outputs thereof connected to the display input of the aforesaid readout.

13. The invention of claim 11 further characterized by a transmit-receive switch connected between the output of said transmitter and the input of the aforesaid electroacoustical energy converter of said liquid lens transducer and between the output of the aforesaid electroacoustical energy converter of said liquid lens transducer and the input of said receiver.

* * * * *